Oct. 22, 1935.  F. O'NEILL ET AL  2,018,030
GLASSWARE FORMING MACHINE
Filed June 7, 1934   12 Sheets-Sheet 1
FIG-1-
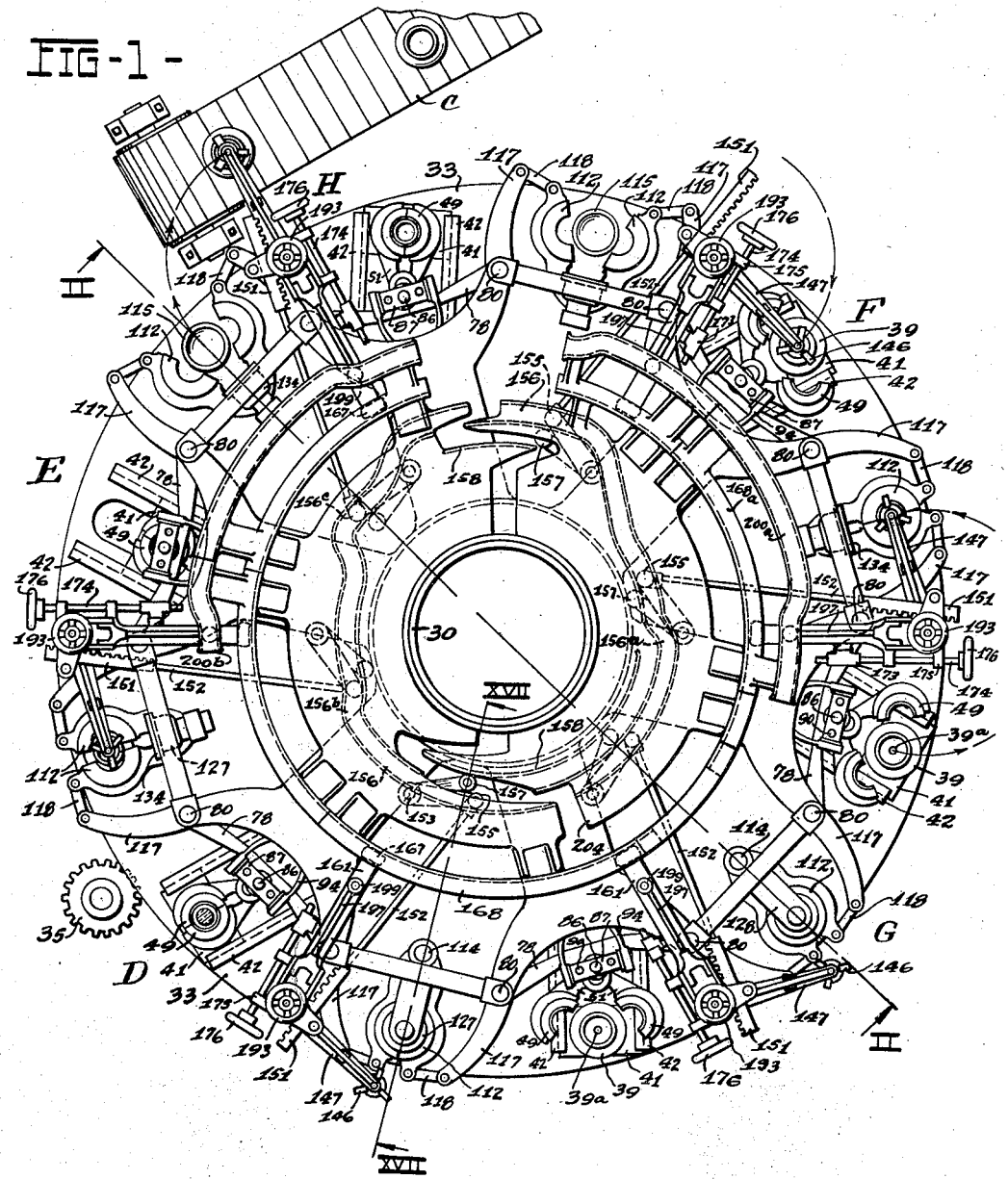
Inventors
Frank O'Neill
and
Clarence C. Kinker
By
J. F. Rule, Attorney

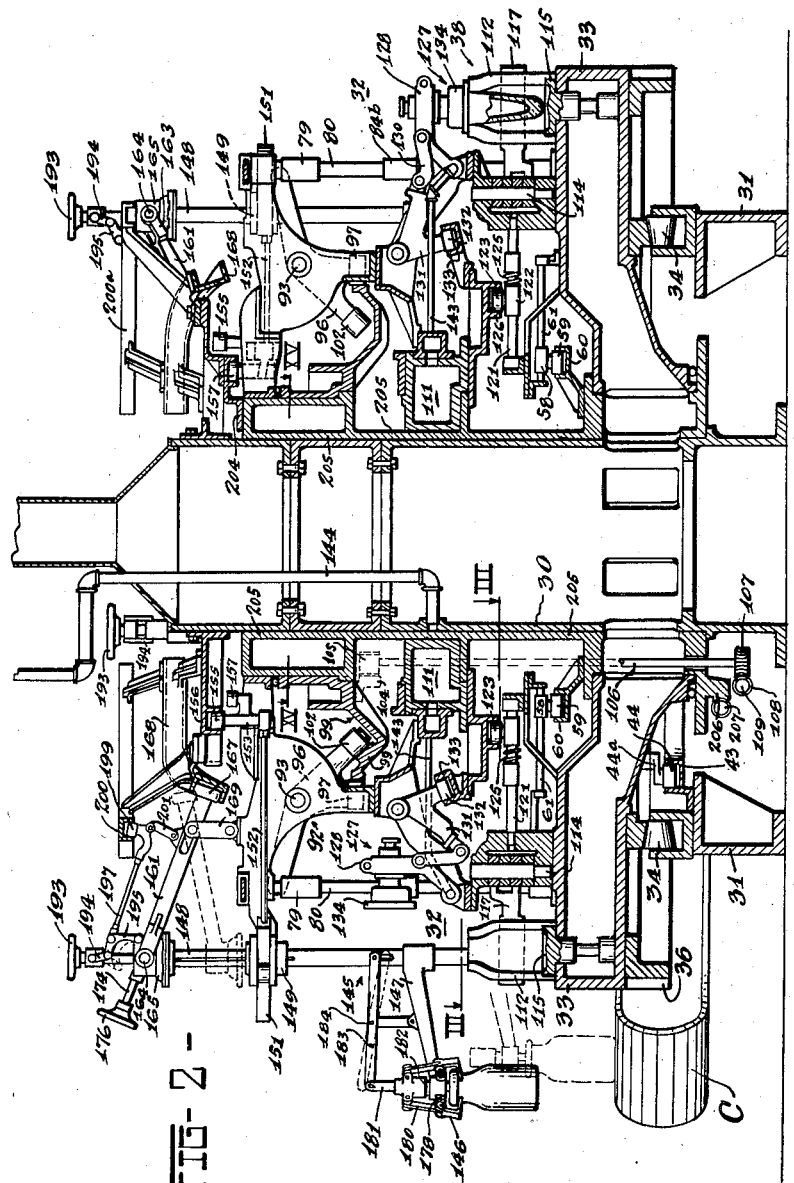

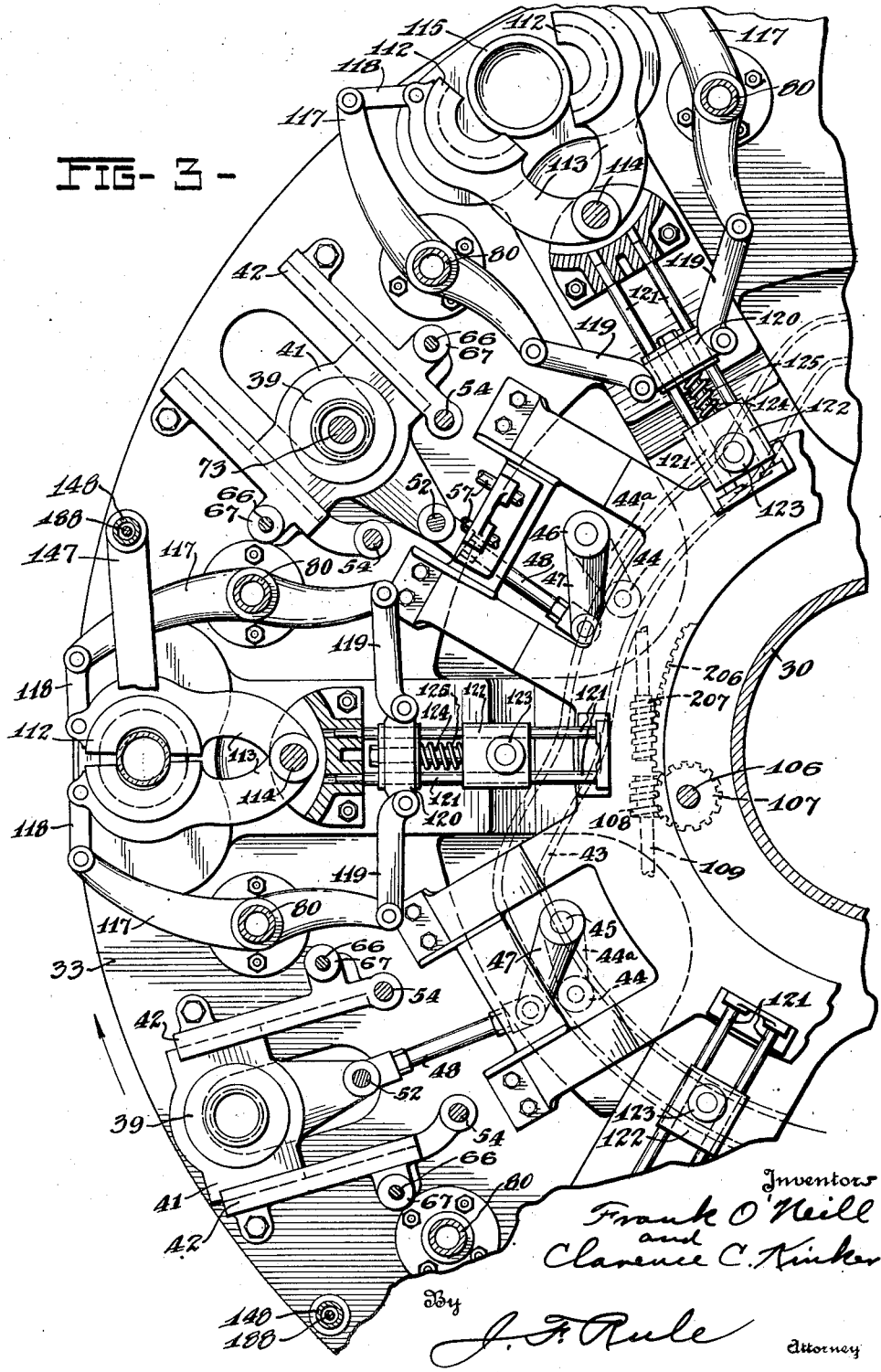

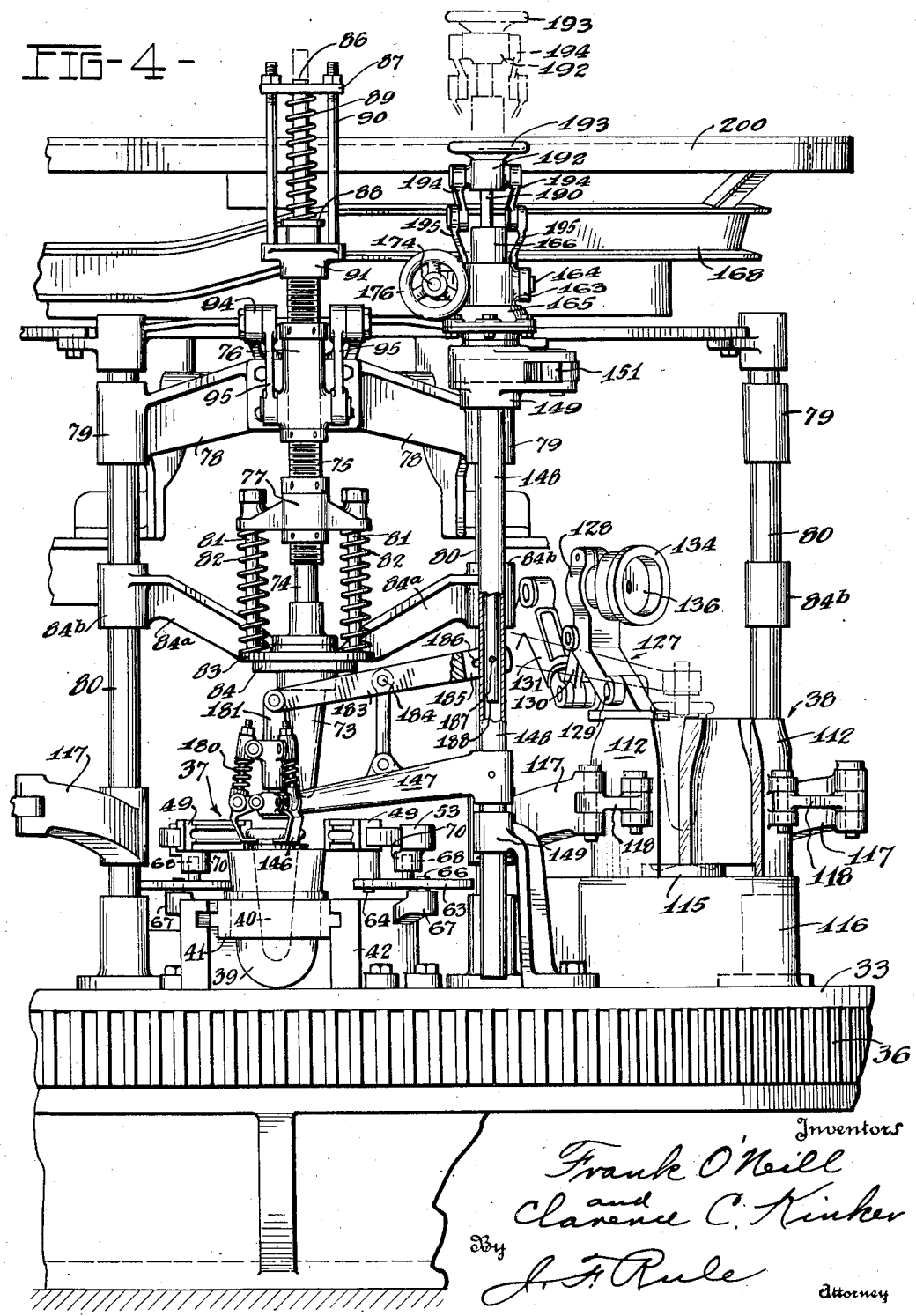

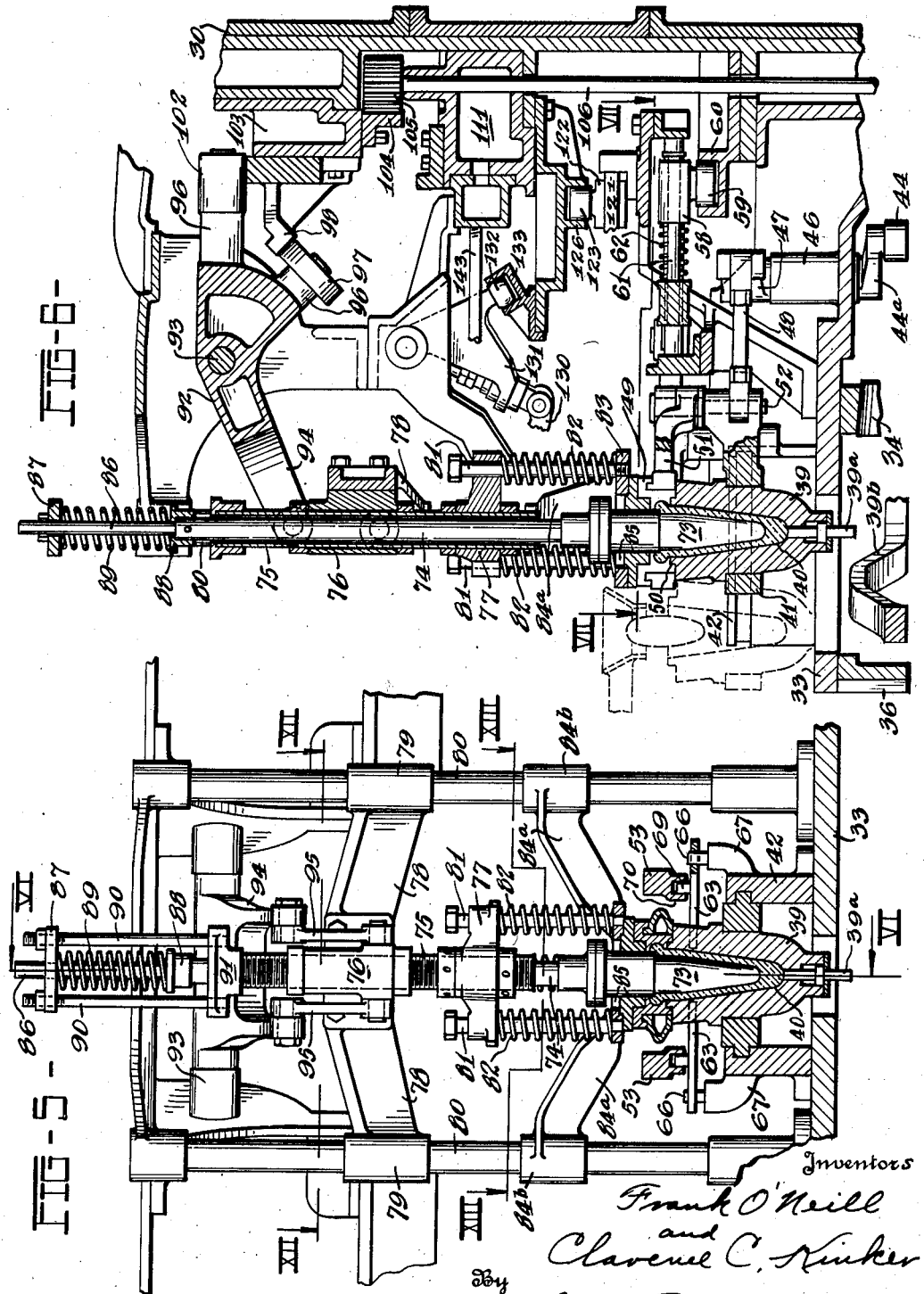

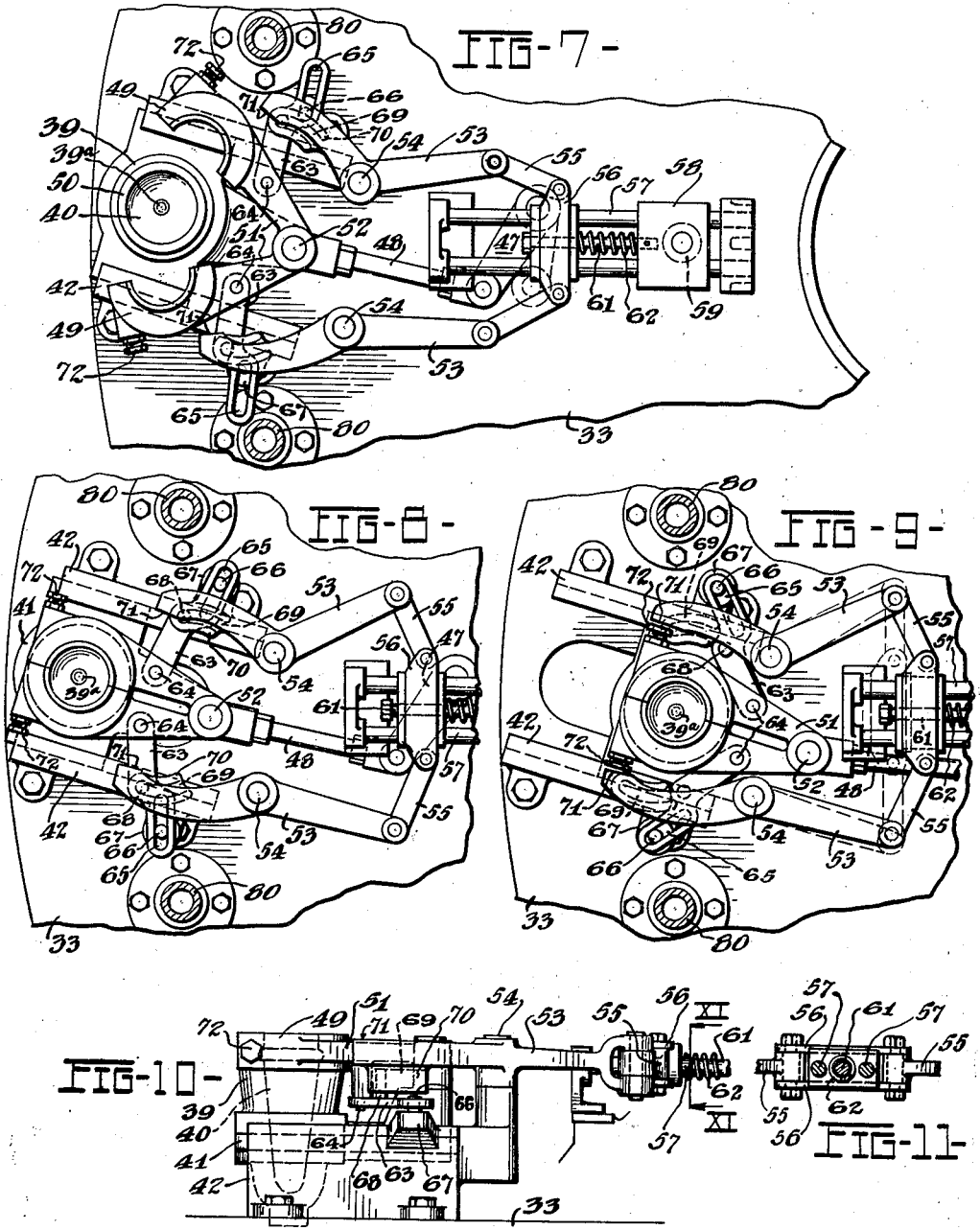

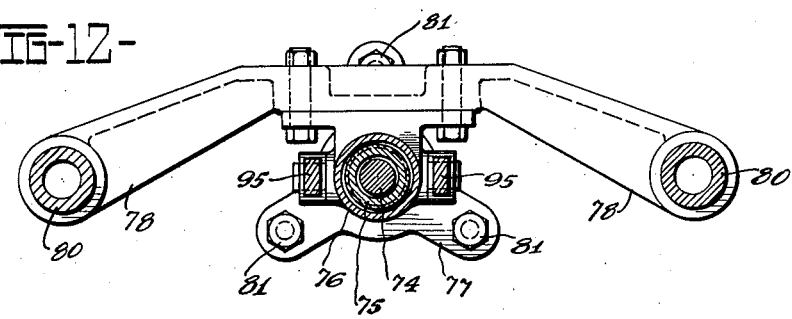
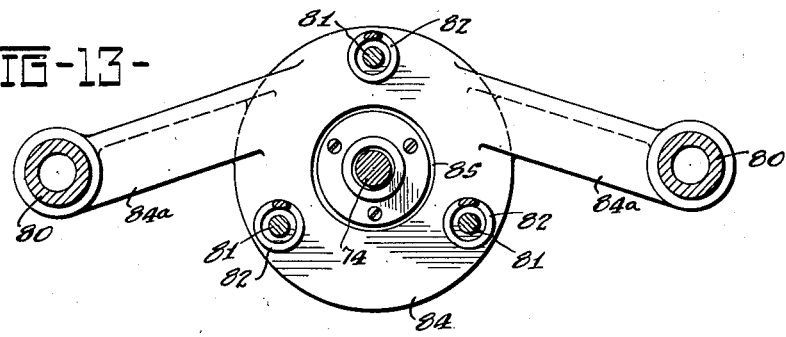
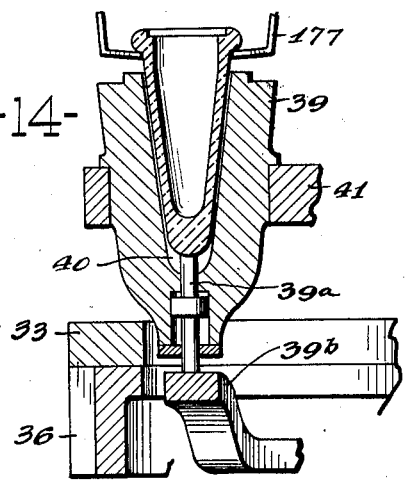

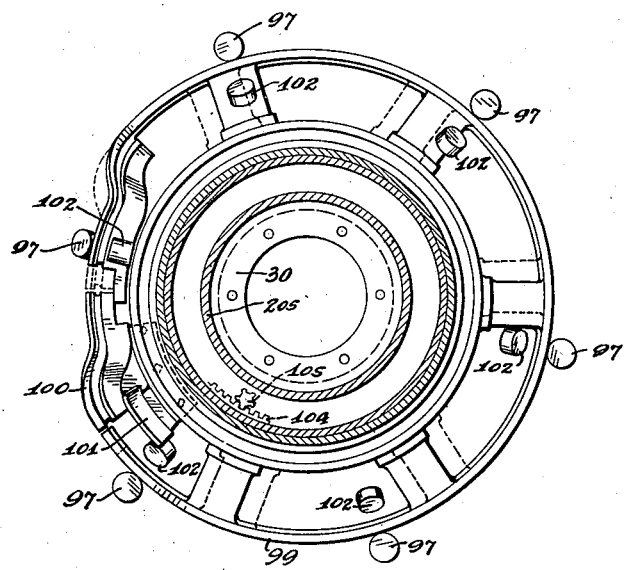
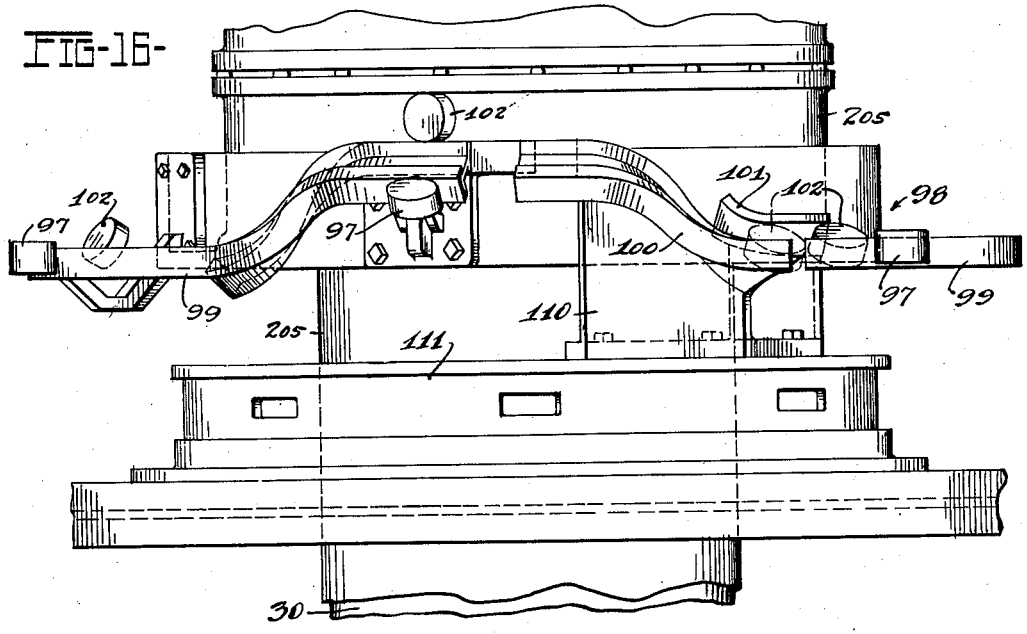

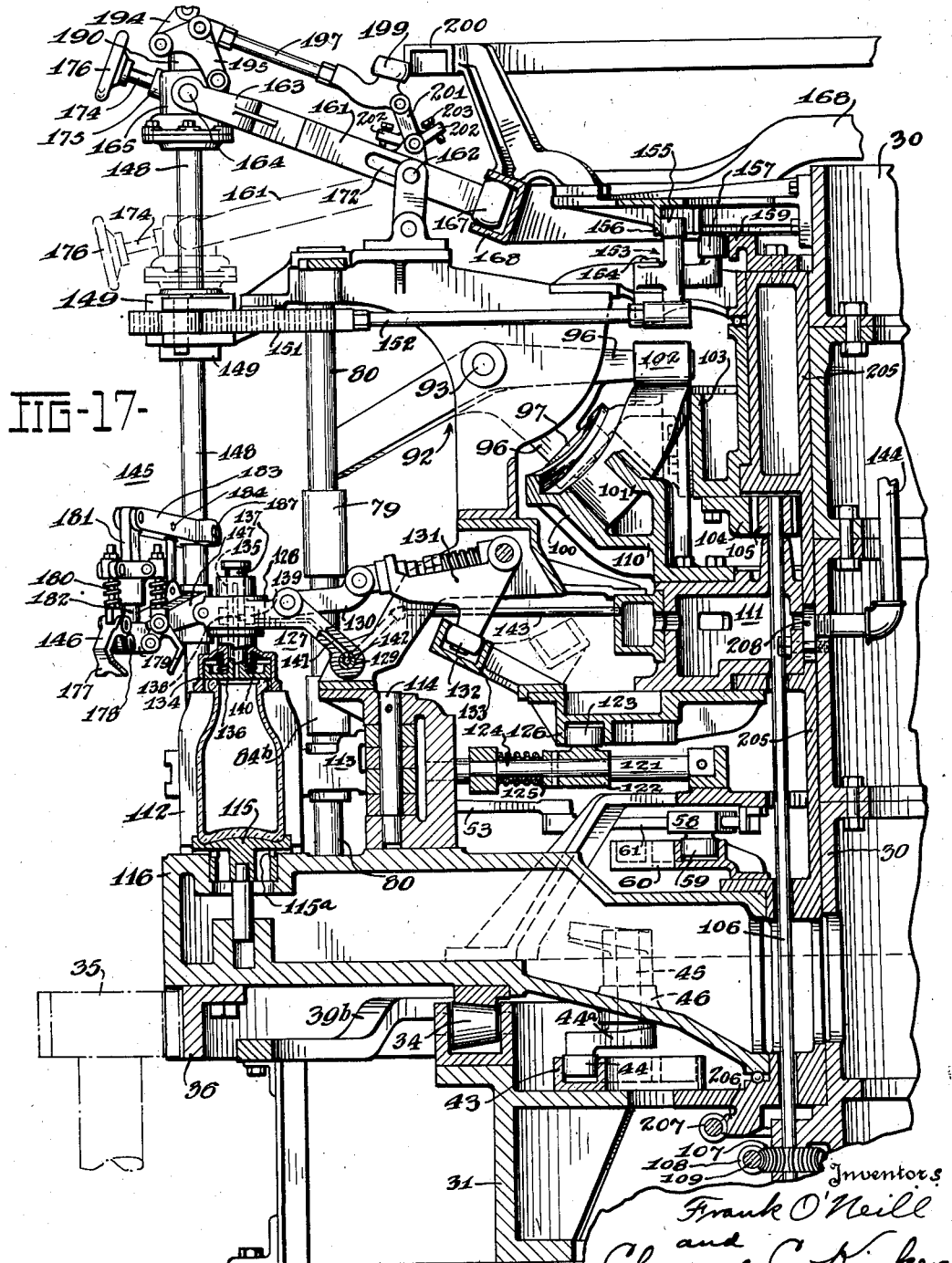

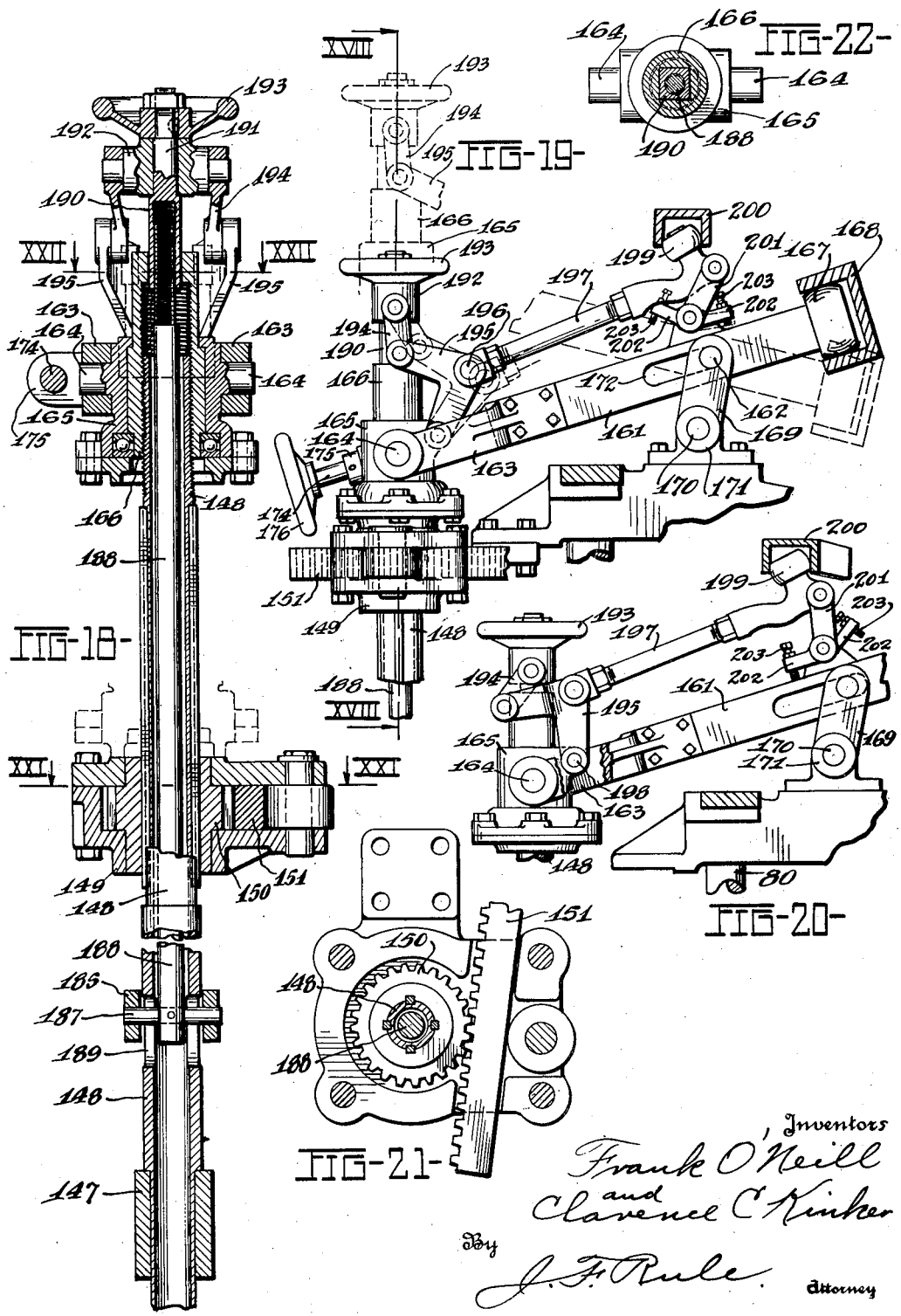

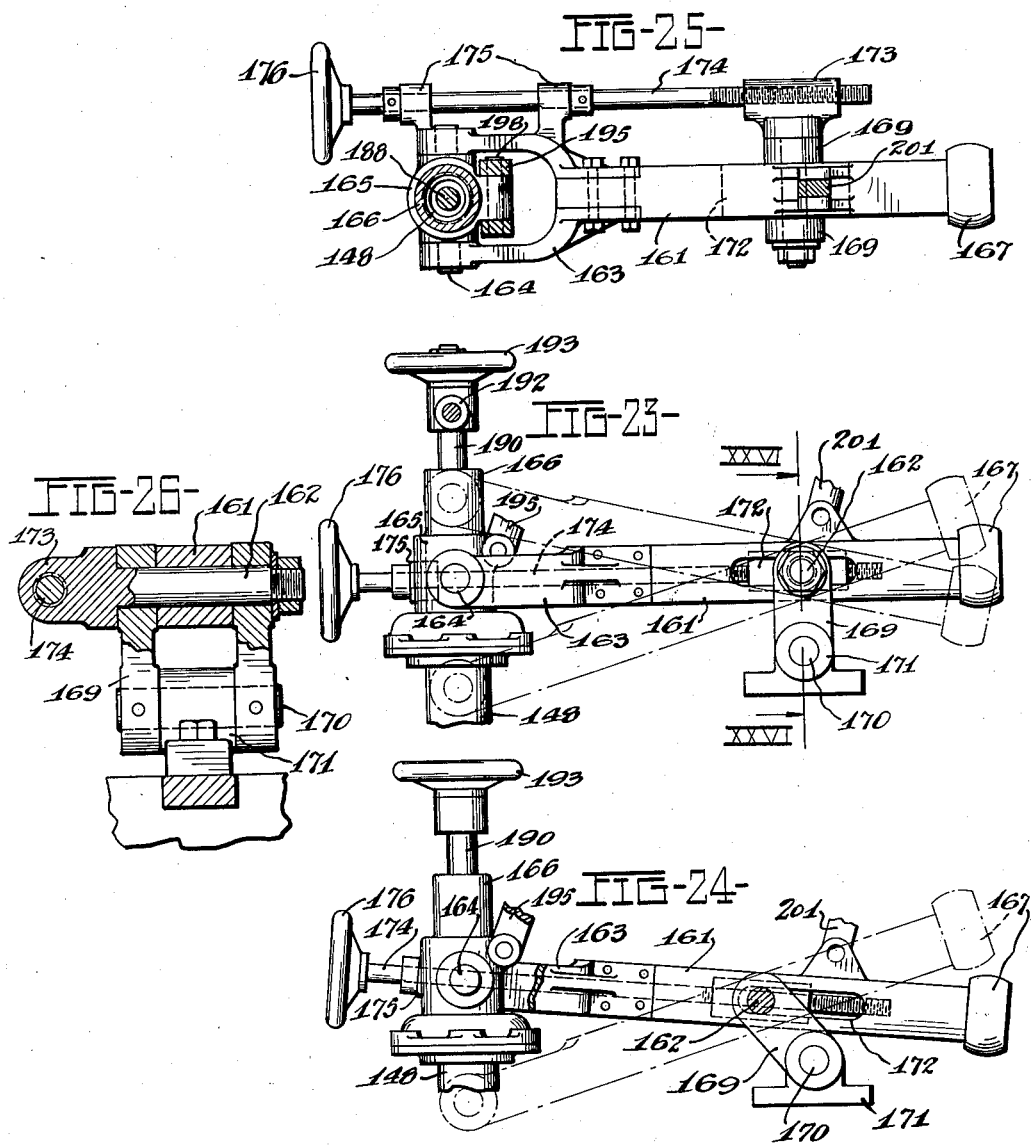

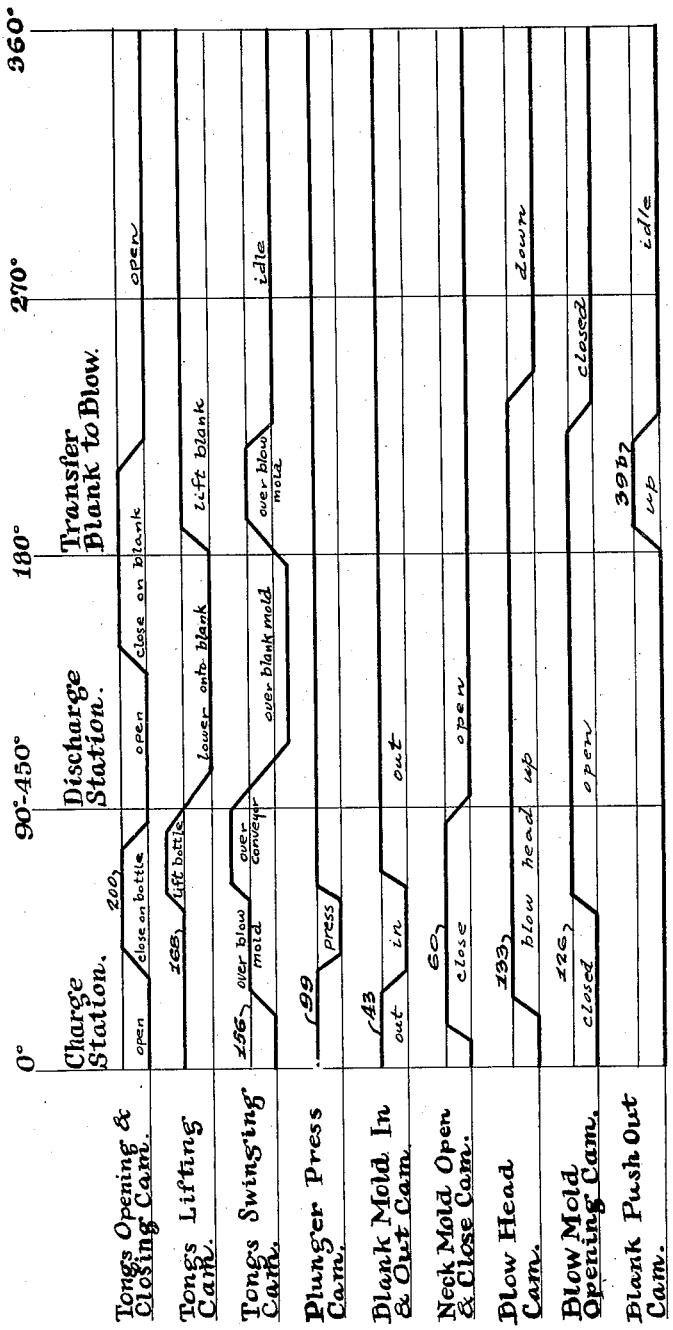

Patented Oct. 22, 1935

2,018,030

UNITED STATES PATENT OFFICE 2,018,030

GLASSWARE FORMING MACHINE

Frank O'Neill, Toledo, Ohio, and Clarence C. Kinker, Alton, Ill., assignors to Owens-Illinois Glass Company, a corporation of Ohio Application June 7, 1934, Serial No. 729,424

22 Claims. (Cl. 49—9)

The present invention relates to improvements in glassware forming machines and more particularly to a continuously rotating single table machine designed to produce hollow articles of glassware such as bottles and jars.

An object of the present invention is the provision of a structure in which the blank and finishing molds are arranged in substantially the same horizontal plane and readily accessible to the operators whereby to facilitate changing of the molds without interrupting operation of the machine.

Another object is the provision in a machine of the above character of novel means in the form of a single transfer device for each bottle forming unit designed to perform the two-fold function of transferring blanks from the blank mold to the finishing mold and removing finished articles from the finishing mold.

A further object is the provision of novel mechanism for supporting and operating a pressing plunger, which constitutes a part of each mold group, whereby the effectiveness of the plunger may be regulably controlled to meet the specific requirements of the article being produced.

A further object is the provision in a continuously rotating machine of the above character, of means whereby certain of the cams which control the operations of the various mechanisms may be adjusted without interfering with normal operation of the machine, to change the timed relation between and, if desired, the duration of certain phases of the cycle of operations involved in transforming a mold charge of molten glass into a finished article.

Other objects will be in part apparent and in part pointed out hereinafter.

In the drawings:

Fig. 1 is a skeleton plan view of a machine constructed substantially in accordance with the present invention, parts being omitted for the sake of clarity.

Fig. 2 is a vertical sectional view taken substantially along the line II—II of Fig. 1.

Fig. 3 is a fragmentary sectional plan view taken substantially along the line III—III of Fig. 2.

Fig. 4 is a fragmentary elevational view showing one complete bottle forming unit or mold group.

Fig. 5 is a part sectional front elevational view of the blank mold unit.

Fig. 6 is a sectional elevational view taken substantially along the line VI—VI of Fig. 5.

Fig. 7 is a plan view taken substantially along the line VII—VII of Fig. 6, showing the blank mold projected to its charging position, the neck mold being open.

Fig. 8 is a view similar to Fig. 7 showing the neck mold closed.

Fig. 9 is a view similar to Figs. 7 and 8, but showing the mold retracted to the glass compacting position.

Fig. 10 is a detail side elevational view of the blank mold and its carrier.

Fig. 11 is a detail sectional view taken substantially along the line XI—XI of Fig. 10.

Fig. 12 is a sectional view taken along the line XII—XII of Fig. 5.

Fig. 13 is a sectional plan view taken along the line XIII—XIII of Fig. 5.

Fig. 14 is a detail sectional view of the blank mold showing the means for elevating a blank or parison therein preparatory to transferring it to the finishing mold.

Fig. 15 is a sectional plan view of the plunger control cam taken substantially along the line XV—XV of Fig. 2.

Fig. 16 is a fragmentary side elevational view of the cam shown in Fig. 15.

Fig. 17 is a vertical sectional elevational view taken substantially along the line XVII—XVII of Fig. 1 particularly showing the finishing mold unit.

Fig. 18 is a vertical sectional elevational view of a part of the tongs unit taken substantially along the line XVIII—XVIII of Fig. 19.

Fig. 19 is a fragmentary side elevation view of a portion of the mechanism shown in Fig. 18.

Fig. 20 is a detail side elevational view of the upper portion of the tongs operating mechanism.

Fig. 21 is a sectional elevational view taken along the line XXI—XXI of Fig. 18.

Fig. 22 is a sectional view taken substantially along the line XXII—XXII of Fig. 18.

Figs. 23, 24, and 25 are fragmentary detail views showing the means for adjusting the position of the fulcrum of the lever which actuates the tongs carrier. Fig. 23 is a side elevational view showing the fulcrum set so that the lever imparts a relatively long stroke to the tongs carrier. Fig. 24 illustrates another possible setting of the fulcrum. Fig. 25 is a sectional plan view of the mechanism as illustrated in Fig. 23.

Fig. 26 is a sectional view taken along the line XXVI—XXVI of Fig. 23.

Fig. 27 is a cam chart illustrating the timed relation between the series of operations involved in the production of an article on the present machine.

In more or less general terms the present machine comprises an annular series of mold groups or bottle forming units which are brought in succession to mold charging, compressing, blank transferring and final blowing positions or zones, by continuous movement of said groups or units. Each group consists of a blank mold and a finishing mold arranged side by side and substantially uniformly spaced from their axis of rotation. To facilitate transference of blanks or parisons from the blank mold to the finishing mold, as will be apparent hereinafter, the upper end of the blank mold is disposed at substantially the same elevation as the lower end of the corresponding finishing mold. Mold charges of molten glass are delivered to the blank mold by way of a charging opening in the upper end of the mold. Through this same opening pressing mechanism operates to transform the mold charges into blanks or parisons.

Tongs mechanism individual to and disposed in part between the molds of each group, operates to transfer the blanks or parisons from the blank mold to the finishing mold and following the transformation of the blanks into finished articles this same tongs mechanism functions to remove said articles from the finishing mold and place them upon a machine conveyor designed to carry them to an anealing leer (not shown).

More specifically, our machine includes a hollow central column 30 rising from a base 31 and carrying a series of superposed cams which control (and in some instances adjustably) the sequential operation of mechanisms constituting portions of the bottle forming units 32 or mold groups. A rotary mold carriage 33 upon which said units 32 are mounted, rides upon roller bearings 34 or the like antifriction devices and is continuously rotated about the column 30 by means of a motor or the like (not shown) operating through a pinion 35 running in mesh with a ring gear 36 attached to the lower side of said mold carriage.

Each bottle forming unit or mold group includes a blank mold unit 37 and finishing mold unit 38 arranged side by side and spaced apart in the general direction of the length of the path traveled by the mold groups. The blank may if preferred and as illustrated herein, include a one-piece mold 39 having an upwardly opening cavity 40 therein to which mold charges of molten glass are delivered by any conventional or preferred form of feeder (not shown). This mold is adapted to be shifted substantially radially of the mold carriage between charging and compressing positions and to this end we have provided a horizontally slidable carrier 41 in which the mold is removably mounted.

This carrier 41 may assume the form of a slide mounted in a pair of slideways 42 which are attached to the upper side of the mold carriage 33. Reciprocation of the carrier is obtained by means of a stationary cam 43 which engages a cam roller 44 on a lever 44ª attached to the lower end of a vertical shaft 45 journaled in a bearing 46, said shaft carrying at its upper end a lever 47 which is connected through a rod 48 to the inner end of said slide or carrier. The cam 43 is of such shape that it projects the blank mold to its outermost position preparatory to the charging operation and thereafter slightly in advance of the charge compressing operation moves the carrier 41 and mold 39 to the innermost position as indicated in full lines in Fig. 5. A plunger 39ª in the bottom end of the mold is engaged by a cam 39ᵇ at one point in the cycle of operations for the purpose of elevating the blank relative to the mold.

Associated with each blank mold is a partible neck mold 49 (Fig. 6) designed to close about an upstanding flange 50 surrounding the charge receiving end of the cavity 40 preparatory to the final blank forming operation. The sections of the neck mold are mounted in holders in the form of a pair of arms 51 pivoted to a vertical hinge pin 52 rising from the inner end of the blank mold carrier 41. Opening and closing of the neck mold and momentary locking of the mold against opening during the glass compressing operation may well be obtained by the following mechanism. A pair of bell crank levers 53 (Figs. 7 to 11, both inclusive) are fulcrumed to a pair of vertical hinge pins 54 adjacent the inner ends of the slideways 42. The inner ends of these levers are connected by means of links 55 to a slide block 56 which is mounted upon a pair of horizontal radially extending guide rods 57. Another slide block 58 is mounted on said rods 57 inwardly from the block 56 and carries a cam roll 59 adapted to ride in a stationary cam 60. A rod 61 provides connection between the two slide blocks 56 and 58 and a coil spring 62 encircling this rod normally yieldingly holds the blocks separated the greatest possible extent. Radial outward movement of the inner slide block 58 operates through the coil spring 62 to move the other slide block radially outward and through the links 55 locks the levers so that the outer ends of the latter, which are connected to the neck mold arms 51 are brought together to close the neck mold. Connection between the neck mold arms 51 and bell crank levers 53 of the neck mold opening and closing mechanism includes a pair of links 63 (Figs. 5 and 7 to 10) pivoted to a pair of depending hinge pins 64 on the neck mold arms 51 and extending beyond the opposed slideways 42. The free end portions of these links have vertical longitudinal slots 65 into which pins 66 on bosses 67 project. Intermediate the ends of each link 63 is an upstanding pin 68 which projects into an arcuate downwardly facing channel 69 in a boss 70 on the lower side of the corresponding bell crank lever 53. The inner face of the bell crank levers 53 in proximity to the outer ends thereof are formed with flattened areas 71 designed for engagement with adjustable pads 72 which are in the form of screws threaded into the neck mold holder.

By reference to Figs. 7 to 11, both inclusive, it will be observed that closing of the neck mold while the blank mold unit is projected to its charging position on the mold carriage does not securely lock the mold sections against separation under certain internal pressure such as involved in compacting the glass. However, with this retraction of the mold to the position shown in Fig. 9 and alignment of links 55 (dotted position), the outer ends of the bell crank levers 53 are brought into firm locking engagement with the mold sections through the medium of said flattened areas 71 and the adjustable pads 72.

Upon completion of the mold charging operation which involves dropping a measured quantity of molten glass into the cavity 41 through the open upper end thereof, the mold is moved to its innermost position and the neck mold is locked, as just described, preparatory to the projection of a pressing plunger 73 through said neck mold and into the blank mold 39. The plunger 75 mechanism (Figs. 2, 4, 5, 6, and 12 to 16, both inclusive) whereby said plunger 73 is operated, may well be substantially as follows. The plunger 73 (Figs. 4, 5, and 6) is carried at the lower end of a vertical plunger rod 74 slidingly extending through a sleeve 75 which is rigidly connected intermediate its ends to a vertical guide 76 and at its lower end to a spider 77. The guide 76 is attached to a cross bar 78 having vertical sleeves 79 at its ends slidingly fitted over a pair of vertical guide posts 80. The spider 77 is yieldingly connected by means of rods 81 and coil springs 82 encircling said rods, to a presser plate 83 and bushing 84 which bushing is brought into engagement with the neck mold by downward movement of said spider. The presser plate 83 and bushing 84 are provided with aligned vertical openings 85 through which the plunger 73 is projected into the molds. Arms 84ª provided with vertical guide sleeves 84ᵇ at their outer ends are slidingly fitted over said posts 80 and function to hold said presser plate and bushing in vertical alignment with the guide 76. The reduced upper end 86 of the plunger rod 74 extends through a guide plate 87 between which and a collar 88 is interposed a coil spring 89 encircling said reduced end of the rod. The guide plate 87 is connected to the sleeve 75 by means of rods 90 and a cross bar 91 which is threaded upon the adjacent upper end of said sleeve.

Vertical movement of the plunger and bushing as well as the presser plate involves longitudinal movement of the rod 74, cross bar 78, and arms 84ª relative to the stationary guide posts 80. This is accomplished by a mechanism including a bell crank lever 92 which is pivoted to a horizontal hinge pin 93 mounted in the upper part of the mold carriage, said lever having a forked outer end 94 connected through a pair of links 95 to the guide 76. The inner end of this lever consists of a pair of arms 96 extending radially inward at different angles and elevations. The lower arm carries a cam roll 97 which is adapted to ride upon a cam 98 (Figs. 6, 15, 16, and 17) which cam includes an adjustable section 99 and stationary section 100. A cam section 101 (Figs. 15 and 16) bridges the gap (when one exists) between one end of the adjustable cam 99 and entrance end of the stationary cam section 100. Thus the cam section 101 cooperates with an auxiliary cam roll 102 on the upper arm 96 of said bell crank lever and serves to hold the latter against undesired movement during travel of the lower cam roller 97 from the adjustable cam section 99 to the stationary section 100.

Adjustment of the cam section 99 is made possible by mounting it upon a circular holder 103 to the inner surface of which is attached an internal ring gear 104 running in mesh with a pinion 105 secured to the upper end of a shaft 106. This shaft or adjusting rod is rotated by means including a worm gear 107 engaging a worm 108 on a shaft 109, which shaft may extend to any convenient point and carry an adjusting hand wheel or the like (not shown). Both the stationary sections 100 and 101 are mounted upon a bracket 110 which is arranged upon the upper side of an air pressure chamber 111 encircling the central column 30.

The finishing mold unit 38 consists of a sectional finishing mold 112 (Figs. 1, 2, 3, 4, and 17) carried by a pair of arms 113 pivoted to a vertical hinge pin 114. A bottom plate 115 having ports 115ª for cooling air exhaust is arranged to close the lower end of the mold. This mold, including the bottom plate, is mounted upon an elevated chambered portion 116 of the mold carriage so that its lower end is at approximately the same elevation as the upper end of the corresponding blank mold. Thus transferring of blanks to the finishing mold is greatly facilitated as will be apparent hereinafter. Opening and closing of the finishing mold is obtained by mechanism (Fig. 3) including a pair of levers 117 pivoted to the lower portions of the guide rods 80 and connected at their front ends by links 118 to the free ends of the mold arms 113. Links 119 connect the inner ends of the levers 117 to a slide block 120 which is mounted upon guide rods 121 extending radially of the mold carriage. A slide block, 122 carrying a cam roll 123 is mounted upon said guide rods inwardly from the slide block 120 and is connected to the latter by a rod 124. A coil spring 125 encircles the rod 124 and yieldingly holds the blocks 120 and 122 separated. A cam 126 imparts radial movement to the slide blocks and through said levers and links alternately opens and closes the finishing mold.

Associated with each finishing mold 112 is a blowing head unit 127 (Figs. 1, 2, 4, and 17) through the medium of which blanks or parisons are expanded in said mold. Each of these units may well consist of a pivoted holder 128 hinged to a horizontal hinge pin 129, said holder being connected through a link 130 to a bell crank lever 131 which carries a cam roll 132 adapted for engagement with a stationary cam 133, said cam shaped to cause swinging movement of the holder 128 between the two extreme positions shown at the opposite sides of Fig. 2. A downwardly facing cup 134 is carried by said holder, said cup communicating with a vertical passageway 135 extending upwardly through the holder. A disk 136 (Fig. 17) is arranged within said cup and connected to the lower end of a hollow stem 137 projecting upwardly through said passageway 135. A radial port 138 in the stem 137 is adapted for registry at times with an annular channel 139 provided in the wall of said passageway 135 to which air under pressure is constantly supplied. A coil spring 140 interposed between the disk 136 and upper wall of the cup operates to normally and yieldingly hold the disk in its outermost position with respect to the cup and position said port 138 out of alignment with said channel 139.

Air under pressure is supplied to said channel 139 by way of a conduit 141 in the holder 128 and an axial opening 142 in the hinge pin 129 which opening is connected to a pipe 143 leading to the aforementioned air pressure supply chamber 111. A main supply pipe 144 conducts air under pressure to said chamber 111.

The blanks or parisons are transferred from the blank mold to the finishing mold and the finished articles removed from the finishing mold and placed upon a machine conveyor "C" by means of a single transferring mechanism 145 (Figs. 1, 2, 4, and 17) which mechanism is of such character that it lifts the blanks or parisons sufficiently to bring their lower ends above the upper end of the blank mold and then swings the blank through an arc of approximately 200° to a position over the bottom plate 115 where it may be enclosed in the corresponding finishing mold. Removal of the finished article from the mold involves gripping of the neck portion of the article prior to opening of the finishing mold and then carrying the article through an arc of approximately 90° and depositing it upon the machine conveyor "C". The specific mechanism illustrated herein involves substantially the following construction. A tongs unit 146 is carried by a horizontal arm 147 which is attached to a tubular rock shaft 148 mounted for axial reciprocation in a pair of vertically spaced guides 149. Rocking of the shaft 148 to thereby swing the arm 147 and position the tongs unit as desired is obtained by cam operated rack and pinion mechanism including a pinion 150 splined to said shaft and meshing with a horizontal rack bar 151 to the inner end of which is attached a reach rod 152. A double armed bell crank lever 153 at the inner end of the rack is pivoted to a vertical hinge pin 154. A cam roller 155 on one arm is adapted to engage a cam 156 which is shaped to rock said lever and thereby reciprocate the rack bar 151 periodically. The other arm carries an auxiliary cam roller 157 which contacts a pair of lap cam sections 158 (Fig. 1) during movement from an adjustable section 159 to a stationary section 160.

Axial movement of the tubular shaft 148 and tongs supporting arm 147 is obtained by mechanism including a lever 161 (Figs. 17, 19, 20, 23, 24, and 25) pivoted to an adjustable hinge pin 162 and having a fork 163 at its outer end fulcrumed upon a pair of trunnions 164 (Fig. 18) formed integrally with a vertical guide 165 in which an internally threaded sleeve 166 is rotatively mounted, said sleeve being threaded upon the tubular shaft 148. The inner end of the lever 161 carries a cam roller 167 adapted for engagement with a stationary cam 168 which is shaped to rock said lever periodically in timed relation to operation of other mechanisms.

By changing the location of the hinge pin 162 in the direction of the length of the lever 161 it is possible to regulably control the limit of upward travel of the outer end of said lever and thereby correspondingly control the uppermost position of the tongs 146. This is of importance in that it facilitates adjustment of the transfer mechanism to compensate for the variations in the length of the blanks or parisons being delivered and the difference in position of the upper end of the finishing mold where molds of different lengths are used. The construction involved consists of mounting the hinge pin 162 (Figs. 23 and 26) at the upper end of a pair of arms 169 which in turn are pivoted to a horizontal hinge pin 170 carried by a stationary bracket 171. The hinge pin 162 extends through a longitudinal slot 172 in the lever 161 and at one end is connected to an internally screw threaded sleeve 173. An adjusting rod 174 journaled in bearings 175 on one of the forks (Fig. 25) is threaded through the sleeve 173 and carries a hand wheel 176 by means of which it may be rotated for the purpose of moving the hinge pin 160 in the direction of the length of said lever 161.

The tongs unit 146 consists of three jaws 177 pivoted to hinge pins 178 on a carrier 179 secured to the outer end of said arm 147. Links 180 (Figs. 4 and 17) connect said jaws 177 to a collar 181 which slides vertically on a guide rod 182 rising from said carrier 179. A lever 183 fulcrumed upon a horizontal hinge pin 184 is provided with a forked inner end 185 which straddles the lower portion of the tubular shaft 148. This forked end is provided with a pair of opposed slots 186 through which projects a connector pin 187 carried by the lower end of a rod 188. This pin 187 also projects through a pair of slots 189 in said tubular shaft 148. The upper end of the rod 188 (Fig. 18) is threaded into a socket 190, the exterior surface of which is angular (square, for example) in cross section and fits into a correspondingly shaped vertical opening in the upper end of the internally screw threaded sleeve 166. This socket 190 is provided at the lower end of a rod 191 which extends through a guide member 192 and above the latter is attached to a hand wheel 193. A pair of links 194 connect said guide member 192 and a pair of bell crank levers 195 which are pivoted by means of a hinge pin 196 to a reach rod 197. The other or lower arms of said bell crank levers are pivoted to a hinge pin 198 carried by the guide 165. The inner end of the reach rod 197 carries a cam roller 199 which is engaged periodically by a cam 200. A rocker arm 201 is pivoted to the inner end of said reach rod 197 in proximity to the cam roller and carries a pair of fingers 202 in which stops 203 consisting of adjustable screws are mounted. These stops limit the possible reciprocating movement of the reach rod 197.

By rotating the hand wheel 193 (Figs. 4 and 18) the socket 190 and guide sleeve 166 are rotated resulting in axial movement of the tubular shaft 148 and rod 188 as a unit. Thus the levels at which the tongs operate may be regulably controlled. When the tongs are wide open the reach rod 197 is in its forward position (Fig. 20). At the commencement of the blank transferring operation (Fig. 4) the arm 147 supports the tongs over the corresponding blank mold. The tongs are closed by upward movement of the rod 188 in the tubular shaft 148 under influence of the cam 200. This cam holds the tongs closed during the entire transferring operation and after the finishing mold has enclosed the blank, opens the tongs momentarily. By again moving the arm 147 the tongs may be placed in front of the finishing mold and thereafter the cam 200 acts to move the reach rod 197 inwardly until the bell crank 195 reaches the dotted line position shown in Fig. 19. At this point the stop 203 comes to rest upon the arm 161 and the cam roll 199 passes from the adjustable section 200$^a$ to the stationary section 200$^b$ of the cam 200.

In order to provide for and facilitate changing the timed relation between certain fabricating operations and in some instances regulating the period of duration of certain of these fabricating operations, certain cams are adjustable or provided with adjustable sections as has been brought out to some extent in the foregoing description. The plunger operating cam 99 (Figs. 6, 15, 16, 17, and 27) is adjustable relative to a stationary section 100 as brought out heretofore for the purpose of regulably controlling the point at which the plunger is retracted from the blank mold and the period of time the plunger is in contact with the mold charge.

The cam 156 which regulates the swinging movements of the tongs units includes an adjustable section 204 which may be moved about the central column 30. This adjustable section is attached to the upper end of a circumferentially adjustable sleeve 205 encircling the central column and provided at its lower end with at least a segment of a worm gear 206 meshing with a worm 207 which worm may be rotated by any suitable means. This sleeve 205 has an opening 208 therein through which air under pressure may flow from the supply pipe 144 to the air chamber 111. As will be observed by reference to Fig. 1 the cam 156 is of such contour that at the transfer station "T" it imparts backward swinging motion to the tongs unit with respect to the direction of travel of the mold carriage thereby transferring the blank or parison from the blank mold to the finishing mold. Shortly beyond the point at which the blank transferring operation is effected, said cam 156 is formed with and offset with an angular portion 156ᵃ which operates to move the tongs a short distance substantially radially outward from the finishing mold. An angular portion 156ᵇ again brings the tongs into position over the finishing mold preparatory to gripping the upper end of a finished article and the angular portion 156ᶜ causes movement of the tongs into a position to deposit the finished article upon the conveyor "C". The cams 168 and 200 which control vertical movements of the tongs and operation of the latter to grip and release the blanks and/or finished articles, include adjustable sections 168ᵃ and 200ᵃ which are carried by the adjustable section 204 of said cam 156.

The operation of our machine may be substantially as follows. The machine is rotated in a clockwise direction thereby bringing each mold group or bottle forming unit to a series of positions or zones including a charging position "D", pressing or charge compacting position "E", blank or parison transferring position "F", a final blowing position "G", and article discharging or removing position "H". At the charging position "D" a measured quantity of molten glass or mold charge is dropped into the blank mold 39, said mold at this time being in its outermost position on the mold carriage. During travel of the mold group to position "E" the neck mold closes about the upper end of the blank mold and together they are retracted to a position in vertical alignment with the pressing plunger. The pressing plunger is then projected into the blank and neck molds thereby compacting the glass and forcing portions thereof into the neck mold. Continued rotary movement of the machine carries the mold group to the transferring position "F" and during such movement the blank mold is again projected to its outermost position into the neck mold opening. The cam 39ᵇ (Fig. 6) pushes the plunger 39ᵃ up and thereby raises the blank a short distance. The tongs 146 are then brought into engagement with that portion of the blank or parison projecting above the upper end of the blank mold, these tongs thereafter being moved vertically upward sufficiently to bring the bottom end of the blank above the top of the blank mold. The tongs supporting arm 147 is then swung through an angle of approximately 200° with the result that the blank is suspended directly over the mold bottom plate 115 of the finishing mold, the latter then being closed about said blank. The tongs are removed from engagement with the parison and at the final blowing position "G" the blowing head 127 is swung downwardly into operative position over the finishing mold. Engagement of the blowing head with the mold automatically establishes communication between the source of supply of air under pressure and the hollow blank by aligning the port 138 and channel 139, with the result that the blank is expanded to its final shape. By the time the mold reaches the discharging or article removing position "H" the glass will have set and cooled sufficiently to insure against collapse when the article is placed unconfined upon the conveyor "C". The tongs are again brought into supporting engagement with the neck of the article after which the finishing mold opens. The cam 168 lifts the tongs and, therefore, the article gripped thereby a short distance to clear the bottom plate and thereafter the tongs supporting arm 183 is swung through an angle of approximately 90°. This positions the article over the machine conveyor "C" as it passes through the discharging zone "H" and during such movement through this zone the tongs are operated to release the article which drops a short distance to an upright position on the conveyor. As brought out herein, the timed relation between and duration of certain of the fabrication operations may be regulably controlled by adjusting various cams and/or cam sections.

Modifications may be resorted to within the spirit and scope of the appended claims.

What we claim is:

1. In combination, a mold carriage mounted for rotation about a vertical axis, an annular series of bottle forming units on said carriage, each unit including blank and finishing molds arranged side by side and spaced apart circumferentially of the carriage, means for forming a blank in the blank mold, means for expanding a blank to the form of a finished article in the finishing mold, and a single transferring device for each unit moving therewith and operable to transfer a blank from the blank mold to the finishing mold and for removing a finished article from the finishing mold.

2. In combination, an annular series of bottle forming units mounted for rotation about a vertical axis, each unit including a blank mold and finishing mold arranged side by side and spaced apart circumferentially of the path of travel of said molds, said finishing mold having its lower end disposed at approximately the same elevation as the upper end of the blank mold, means for forming a blank in the blank mold, means for expanding the blank to the form of a finished article in the finishing mold, and a single transferring device for each unit moving therewith and operable to transfer a blank from the blank mold to the finishing mold and for removing a finished article from the finishing mold.

3. A glassware forming machine comprising an annular series of bottle forming units mounted for rotation about a vertical axis, means for continuously rotating said units, each unit including blank and finishing molds arranged side by side and spaced apart circumferentially of their path of travel, said molds being disposed at different elevations, means for forming a blank in the blank mold, and a single device moving with the molds for transferring the blank to the finishing mold unit and later removing the blank in the form of a finished article from said finishing mold.

4. A glassware forming machine comprising an annular series of bottle forming units mounted for rotation about a vertical axis, means for continuously rotating said units, each unit including blank and finishing molds arranged side by side and spaced apart circumferentially of their path of travel, said molds being disposed at different elevations, means for forming a blank in the blank mold, a single mechanism for transferring the blank to the finishing mold and later removing the blank in the form of a finished article from said finishing mold, said mechanism including a tongs unit, an arm supporting said tongs unit and mounted for oscillation about a vertical axis between said molds, and cam controlled devices for imparting vertical and oscillatory movements to said arm and actuating said tongs unit to alternately grip and release the blanks and finished articles.

5. In a glassware forming machine, a mold carriage mounted for rotation about a vertical axis, a blank mold unit including a mold having an upwardly facing cavity, means for shifting the blank mold substantially radially of the carriage between charging and charge compacting positions, a finishing mold spaced circumferentially of the carriage from the charging position of the blank mold and mounted on said carriage, and a single mechanism mounted upon the carriage between said molds and operable to transfer blanks from the blank mold to the finishing mold and removing finished articles from the latter.

6. In a glassware forming machine, a mold carriage, a blank mold unit thereon including a blank mold carrier, a blank mold including a partible neck mold mounted upon said carrier, means for shifting the carrier on the mold carriage between charging and charge compacting positions, mechanism for closing the neck mold at the charging position, and means whereby movement of the mold to the compacting position and a second operation of said mechanism locks the neck mold against premature opening.

7. In a glassware forming machine, a mold carriage, a blank forming unit thereon including a blank mold carrier, a blank mold mounted on the carrier, means for moving said carrier and mold between a charging and charge compacting position, a partible neck mold forming a part of the blank mold, a pair of pivoted arms supporting the neck mold, bell crank levers, links pivoted to said arms, and having pin and slot connection to said levers, means for rocking said levers to thereby close the neck mold in the charging position, and means for imparting additional movement to the levers upon arrival of the mold at the compacting position to secure the neck mold against opening in said position.

8. In a glassware forming machine, a mold carriage, a blank forming unit thereon comprising a mold carrier, a blank mold on said carrier including a partible neck mold, mechanism for shifting the carrier and mold horizontally between charging and charge compacting positions, mechanism for closing the neck mold at the charging position, and means whereby said mechanism is operated a second time upon and in part by movement of the mold to the compacting position to lock said neck mold against premature opening.

9. In a glassware forming machine, a mold carriage mounted for rotation about a vertical axis, a bottle forming unit thereon including a blank mold unit and a finishing mold unit arranged side by side, said blank mold unit including a blank mold having an upwardly facing cavity to receive a mold charge, means for shifting the blank mold between charging and charge compacting positions, a plunger, mechanism for projecting the plunger into the blank mold in the compacting position to completely form a blank, a partible finishing mold constituting a part of said finishing mold unit, mechanism arranged between said mold units for transferring the blank from the blank mold to the finishing mold, means for expanding the blank in the finishing mold, and means whereby said blank transferring mechanism is operated to remove the finished article from said finishing mold.

10. In a glassware forming machine, a mold carriage mounted for rotation about a vertical axis, a bottle forming unit thereon including a blank mold unit and a finishing mold unit arranged side by side, said blank mold unit including a blank mold having an upwardly facing cavity to receive a mold charge, means for shifting the blank mold horizontally between charging and charge compacting positions, a plunger, mechanism for projecting the plunger into the blank mold in the compacting position to completely form a blank, a finishing mold constituting a part of said finishing mold unit and having its lower end disposed at about the same elevation as the upper end of said blank mold, blank transferring mechanism for elevating the blank to a position above the blank mold and then swing it horizontally to a position in which it may be enclosed in a finishing mold, means for expanding the blank in said finishing mold, and means whereby said blank transferring mechanism is operated to remove the expanded blank from the finishing mold.

11. In a glassware forming machine, a bottle forming unit comprising a one-piece body blank mold having an upwardly facing cavity, a partible neck mold associated with said body blank mold, a particle finishing mold arranged beside said blank mold with its lower end at about the same elevation as the upper end of the body blank mold, means for forming a blank in said body blank and neck molds, transferring mechanism arranged between said body blank and finishing molds and including a tongs unit, means whereby the tongs unit is actuated to engage and lift a blank out of the body blank mold and then move it horizontally to the finishing mold, and means for expanding the blank in the finishing mold to the form of a finished article.

12. In a glassware forming machine, a bottle forming unit comprising a one-piece body blank mold having an upwardly facing cavity, a partible neck mold associated with said body blank mold, a partible finishing mold arranged beside said blank mold with its lower end at about the same elevation as the upper end of the body blank mold, means for forming a blank in said body blank and neck molds, transferring mechanism arranged between said body blank and finishing molds and including a tongs unit, means whereby the tongs unit is actuated to engage and lift a blank out of the body blank mold and then move it horizontally to the finishing mold, means for expanding the blank in the finishing mold to the form of a finished article, and means for actuating said tongs unit whereby it removes the finished article from said finishing mold.

13. In combination, a mold group consisting of blank and finishing molds arranged side by side, the lower end of the finishing mold being at about the same elevation as the upper end of the blank mold, said blank mold having an upwardly facing cavity in which a mold charge may deposited, means for transforming the mold charge into a blank, mechanism for transferring the blank to the finishing mold including a tongs unit, a horizontal arm supporting said unit, a vertically reciprocable shaft carrying said arm and disposed between said molds, means for oscillating the arm to thereby alternately place the tongs unit in register with the blank and finishing molds, means for reciprocating said shaft to change the elevation of said arms and tongs unit to compensate for differences in the elevation of the upper ends of said molds, and means for actuating said tongs unit whereby it alternately grips and releases a blank.

14. In combination, a mold group consisting of blank and finishing molds arranged side by side, the lower end of the finishing mold being at about the same elevation as the upper end of the blank mold, said blank mold having an upwardly facing cavity in which a mold charge may be deposited, means for transforming the mold charge into a blank, mechanism for transferring the blank to the finishing mold including a tongs unit, a horizontal arm supporting said unit, a vertically reciprocable shaft carrying said arm, means for oscillating the arm to thereby alternately place the tongs unit in register with the blank and finishing molds, means for reciprocating said shaft to change the elevation of said arm and tongs unit to compensate for differences in the elevation of the upper ends of said molds, means for actuating said tongs unit including a lever pivoted to said arm, a rod within said shaft connected at its lower end to said lever, and mechanism for reciprocating the rod in timed relation to movements of the arm and tongs unit.

15. In combination, a mold group consisting of blank and finishing molds arranged side by side, the lower end of the finishing mold being at about the same elevation as the upper end of the blank mold, said blank mold having an upwardly facing cavity in which a mold charge may be deposited, means for transforming the mold charge into a blank, mechanism for transferring the blank to the finishing mold including a tongs unit, a horizontal arm supporting said unit, a vertically reciprocable shaft carrying said arm, means for oscillating the arm to thereby alternately place the tongs unit in register with the blank and finishing molds, means for reciprocating said shaft to change the elevation of said arm and tongs unit to compensate for differences in the elevation of the upper ends of said molds, means for actuating said tongs unit whereby it alternately grips and releases a blank, said means for reciprocating the shaft including a pivoted lever connected at one end to said shaft, a cam roller at the other end of said lever, a cam adapted to engage said roller and thereby rock the lever, and means for adjusting the pivot in the direction of the length of the lever to thereby regulably control the extent of upward movement of the shaft.

16. Mechanism for transferring a blank from a blank mold at one level to a finishing mold arranged to one side of but at a different level than the blank mold, including a vertical tubular rock shaft disposed between the molds, an arm extending radially from said shaft, a tongs unit on said arm, means for imparting axial movement to the shaft, means for oscillating said shaft, means for actuating the tongs unit whereby it is caused to alternately grip and release blanks, said means for reciprocating the shaft including a lever mounted for rocking movement on a horizontal hinge pin, means for rocking said lever, said lever having a longitudinal slot therein through which the hinge pin extends, a carrier for said hinge pin, means mounted on the lever for adjusting the hinge pin lengthwise of said slot.

17. Mechanism for transferring a blank from a blank mold at one level to a finishing mold arranged to one side of but at a different level than the blank mold, including a vertical tubular rock shaft disposed between the molds, an arm extending radially from said shaft, a tongs unit on said arm, means for imparting axial movement to the shaft, means for oscillating said shaft, means for actuating the tongs unit whereby it is caused to alternately grip and release blanks, said means for reciprocating the shaft including a lever mounted for rocking movement on a horizontal hinge pin, means for rocking said lever, said lever having a longitudinal slot therein through which the hinge pin extends, a carrier for said hinge pin, an internally threaded sleeve on said hinge pin carrier, and an adjusting rod mounted on the lever and threaded into said sleeve for adjusting the hinge pin lengthwise of said slot and thereby regulably controlling the extent of upward movement of said shaft.

18. Mechanism for transferring a blank from a blank mold at one level to a finishing mold arranged at one side of but at a different level than the blank mold, including a vertical tubular rock shaft disposed between the molds, an arm extending radially from said shaft, a tongs unit on said arm, means for imparting axial movement to the shaft, means for oscillating said shaft, means for actuating the tongs unit whereby it is caused to alternately grip and release blanks, said means for actuating the tongs unit including a pivoted lever, a rod arranged within said shaft and pivoted at its lower end to said lever, a bell crank lever connected to the upper end of said rod, and cam means for moving said bell crank lever and thereby reciprocating the rod.

19. In a glassware forming machine, cam controlled mechanism including a pivoted lever, a pair of arms at one end of the lever, cam rolls on said arms, a cam for swinging the lever comprising an adjustable section and a stationary section arranged end to end and adapted to be successively engaged by one of said rolls, a stationary bridge cam section arranged to engage the other roll during movement of the arms from one section to the other, and means causing relative movement between the cam and said mechanism.

20. In a glassware forming machine, a mold carriage mounted for rotation about a vertical axis, a blank mold unit thereon including a blank mold carrier, a blank mold including a partible neck mounted upon said carrier, a pair of arms carrying the partible neck mold and pivoted for horizontal swinging movement to bring the neck mold into operative position, means for shifting the carrier substantially radially of the mold carriage between charging and charge compacting positions, mechanism for closing the neck mold at the charging position and means whereby movement of the carrier to the compacting position and a second operation of said mechanism effects a change in the point of application of closing pressure to the mold and locks said mold against premature opening.

21. In a glassware forming machine, a mold carriage mounted for rotation about a vertical axis, a blank mold unit thereon including a blank mold carrier, a one-piece blank mold mounted on said carrier, said mold having an open upper end, a partible neck mold mounted for movement into and out of operating position at the upper end of the blank mold, mechanism for closing the neck mold at the charging position and holding it closed during movement to the compacting position and means whereby movement of the mold to the compacting position and a second operation of said mechanism locks the neck mold against premature opening and changes the point of application of closing pressure to the neck mold.

22. In a glassware forming machine, a mold carriage mounted for rotation about a vertical axis, a blank mold unit thereon including a blank mold carrier, a one-piece blank mold mounted on said carrier and having an open upper end, a partible neck mold, pivoted arms carrying said neck mold and mounted for horizontal swinging movement to thereby place the neck mold over the blank mold at times, means for shifting the carrier substantially radially of the mold carriage between charging and charge compacting positions, mechanism for closing the neck mold at the charging position, including links and levers connected to inner end portions of the mold arms, means for actuating the levers and means whereby movement of the blank mold unit to the compacting position and a second operation of the mold closing mechanism effects engagement between said levers and the outer end portions of the mold arms to thereby lock the neck mold against premature opening.

FRANK O'NEILL.
CLARENCE C. KINKER.